United States Patent
Kuo et al.

(10) Patent No.: US 12,293,260 B2
(45) Date of Patent: May 6, 2025

(54) GENERATING AND DEPLOYING PACKAGES FOR MACHINE LEARNING AT EDGE DEVICES

(71) Applicant: Amazon Technologies, Inc., Seattle, WA (US)

(72) Inventors: Calvin Yue-Ren Kuo, Mercer Island, WA (US); Jiazhen Chen, Bellevue, WA (US); Jingwei Sun, Issaquah, WA (US); Haiyang Liu, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1150 days.

(21) Appl. No.: 15/884,279

(22) Filed: Jan. 30, 2018

(65) Prior Publication Data

US 2019/0156246 A1     May 23, 2019

Related U.S. Application Data (60) Provisional application No. 62/589,512, filed on Nov. 21, 2017.

(51) Int. Cl.
   *G06N 20/00*            (2019.01)
   *G06F 8/60*             (2018.01)
   (Continued)

(52) U.S. Cl.
   CPC ............... *G06N 20/00* (2019.01); *G06F 8/60* (2013.01); *G06F 18/214* (2023.01); *G06N 5/04* (2013.01); *H04W 4/38* (2018.02)

(58) Field of Classification Search
   CPC ........ G06N 20/00; G06N 20/10; G06N 20/20; G06N 5/04; G06F 8/60; G06K 9/6256; H04W 4/38
   See application file for complete search history.

(56) References Cited

U.S. PATENT DOCUMENTS 8,402,437 B2 *   3/2013   Dhanakshirur ............ G06F 8/20
                                                        717/121
8,595,154 B2 *   11/2013   Breckenridge ........ G06N 20/00
                                                        706/12

(Continued)

FOREIGN PATENT DOCUMENTS

CN       106803218 A     6/2017
CN       107343000 A     11/2017

(Continued)

OTHER PUBLICATIONS

Ding, Ying, et al. "Bias correction for selecting the minimal-error classifier from many machine learning models." Bioinformatics 30.22 (2014): 3152-3158. (Year: 2014).*

(Continued)

*Primary Examiner* — Omar F Fernandez Rivas
*Assistant Examiner* — Chaitanya R Jayakumar
(74) *Attorney, Agent, or Firm* — Robert C. Kowert; Kowert, Hood, Munyon, Rankin & Goetzel, P.C.

(57) ABSTRACT

A provider network implements a machine learning deployment service for generating and deploying packages to implement machine learning at connected devices. The service may receive from a client an indication of an inference application, a machine learning framework to be used by the inference application, a machine learning model to be used by the inference application, and an edge device to run the inference application. The service may then generate a package based on the inference application, the machine learning framework, the machine learning model, and a hardware platform of the edge device. To generate the package, the service may optimize the model based on the hardware platform of the edge device and/or the machine learning framework. The service may then deploy the package to the edge device. The edge device then installs the (Continued)

inference application and performs actions based on inference data generated by the machine learning model.

20 Claims, 7 Drawing Sheets

(51) Int. Cl.
*G06F 18/214* (2023.01)
*G06N 5/04* (2023.01)
*H04W 4/38* (2018.01)

(56) References Cited

U.S. PATENT DOCUMENTS

| | | | |
|---|---|---|---|
| 8,996,642 B1* | 3/2015 | Bellini, III | G06Q 30/016 709/224 |
| 9,183,507 B1* | 11/2015 | Lin | G06N 5/04 |
| 9,201,558 B1* | 12/2015 | Dingman | G06F 15/16 |
| 9,356,883 B1* | 5/2016 | Borthakur | G06F 9/5027 |
| 9,781,243 B1 | 10/2017 | Huang | |
| 9,781,743 B2 | 10/2017 | van Loon | |
| 2004/0233609 A1 | 11/2004 | Yoshida et al. | |
| 2015/0206440 A1 | 7/2015 | Aylesworth et al. | |
| 2015/0347907 A1* | 12/2015 | Mathew | H04L 67/10 706/12 |
| 2016/0232457 A1* | 8/2016 | Gray | G06F 16/26 |
| 2016/0254962 A1* | 9/2016 | Ansari | H04L 65/102 709/225 |
| 2016/0358098 A1* | 12/2016 | Duesterwald | G06N 20/20 |
| 2017/0048308 A1 | 2/2017 | Qaisar | |
| 2017/0185921 A1* | 6/2017 | Zhang | G06N 20/00 |
| 2017/0279833 A1* | 9/2017 | Vasseur | H04L 45/08 |
| 2018/0060759 A1* | 3/2018 | Chu | G06N 20/00 |
| 2019/0050746 A1* | 2/2019 | Sanketi | G06N 20/00 |

FOREIGN PATENT DOCUMENTS

| | | |
|---|---|---|
| JP | 2016510451 A | 4/2016 |
| KR | 20040020933 A | 3/2004 |
| KR | 20040071597 A | 8/2004 |
| KR | 20140131291 A | 11/2014 |
| WO | 2003001413 A1 | 1/2003 |

OTHER PUBLICATIONS

Feurer, Matthias, et al. "Efficient and robust automated machine learning." Advances in neural information processing systems 28 (2015). (Year: 2015).*

International Search Report and Written Opinion from PCT/US2018/061937, Amazon Technologies, Inc., dated Feb. 27, 2019, pp. 1-15.

Notice of Allowance in Japanese Patent Application No. 2020-545064 mailed Aug. 10, 2021, Amazon Technologies, Inc., pp. 1-4 with translation.

Notice of Allowance mailed Mar. 31, 2022 in Korean Patent Application No. 10-2020-7015727, Amazon Technologies, Inc., p. 1.

Office Action mailed Feb. 11, 2023 in Chinese Patent Application No. 201880075286.6, Amazon Technologies, Inc., pp. 1-17 (including translation).

* cited by examiner

GENERATING AND DEPLOYING PACKAGES FOR MACHINE LEARNING AT EDGE DEVICES

This application claims the benefit of U.S. Provisional Application No. 62/589,512, filed on Nov. 21, 2017, which is herein incorporated by reference in its entirety.

BACKGROUND

Connected computing devices are used in many environments for a variety of applications. Whether in our homes or embedded in vehicles and factories, these devices may use a variety of sensors to monitor surroundings, make predictions, and take actions based on the predictions. In many scenarios (e.g., surveillance cameras, self-driving cars, industry machineries), devices collect a huge volume of data in a very short time and perform real-time decision making based on the collected data. Therefore, in many cases, machine learning inference takes place locally on the device instead of sending the data to another device for analysis. For example, a machine learning model running on the device may process collected data to generate inferences (e.g., predictions). The device may then perform an action based on an inference.

Before a machine learning model is used to generate predictions, it must be trained. Training a machine learning model may require a massive amount of computing resources. Therefore, machine learning models are typically trained by powerful computing systems. After a machine learning model is trained, it may then be moved to a connected device and enabled in order to perform machine learning inference at the connected device. However, numerous steps may be required to enable a machine learning model to run on the connected device. Therefore, the process for enabling a machine learning model to run on a connected device can be quite complicated, time-consuming, and error-prone.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement generating and deploying packages for machine learning at connected devices. A machine learning deployment service of a provider network may receive (e.g., from a user of a client) an indication of an inference application, a machine learning framework to be used by the inference application, a machine learning model to be used by the inference application, and a connected device to run the inference application. The machine learning deployment service may then generate a package based on the inference application, the machine learning framework, and the machine learning model. The machine learning deployment service may then deploy the package to the connected device.

In embodiments, a "connected device," an "edge device," or an "IoT (Internet of Things) device" may refer to the same type of device. In various embodiments, a connected device, an edge device, or an IoT device may refer to any type of computing device suitable for communicating, via one or more networks, with one or more devices of a remote network (e.g., remote provider network) and/or any other devices of the same local network. In embodiments, an "endpoint" may be one or more computing devices and/or one more services that are part of a local network or a remote network, such that information may be transmitted to or from the endpoint via one or more network connections.

In embodiments, a "package" or "machine learning package" may include one or more components that may be used by a connected device and/or may configure a connected device such that the connected device may execute one or more machine learning models and perform one or more actions based on results generated by the one or more models. For example, a connected device download a machine learning package that includes one or more components that the IoT device may install and execute to perform facial recognition based on a machine learning model and to perform one or more actions based on facial recognition results generated by the machine learning model. In some embodiments, machine learning may be implemented using any suitable machine learning/artificial intelligence techniques (e.g., neural networks, deep neural networks, reinforcement learning, decision tree learning, genetic algorithms, classifiers, etc.).

A gunshot detection and alert system is an example of implementing machine learning on multiple connected devices. Connected devices (e.g., edge nodes) may be installed on telephone poles throughout a city. Machine learning models may be trained in the cloud (e.g., by a provider network) using gunshot audio samples in order to identify the type of weapon fired and to triangulate the position from which it was fired. Using techniques described herein, machine learning models as well as future updates to the models may be modified (e.g., optimized) for each edge device and rapidly deployed to the edge devices to implement the gunshot detection and alert system.

By generating and deploying packages for machine learning at connected devices, various embodiments allow for advantages over traditional techniques for configuring connected devices to implement machine learning (e.g., inference applications, machine learning frameworks, and/or machine learning models). For example, numerous steps may be required to install and/or enable an inference application and/or a machine learning model (or updated model) to run on the connected device. Therefore, the process of installing and/or enabling the inference application and/or machine learning model may be error-prone and require a considerable amount of time. The installed inference application and/or machine learning model may not be optimally configured to function on the connected device. Therefore, running the inference application and/or machine learning model may consume a large or excessive amount of computing resources of the connected device (e.g., memory, processors, network bandwidth) and may consume an excessive amount of time to generate inference data.

In embodiments, the machine learning deployment service may generate a machine learning package and deploy the package to the connected device for installation in order to allow the connected device to run the inference application and/or a machine learning model in an optimal or more optimal manner (e.g., due to an optimized configuration based on the inference application, machine learning framework to be used by the inference application, machine learning model to be used by the inference application, and/or hardware platform/components of the connected device). For example, the connected device may run the inference application and/or a machine learning model while consuming a smaller amount of computing resources of the connected device (e.g., memory and processors) and/or reducing the amount of time required to generate inference data. In embodiments, generating and deploying packages for machine learning at connected devices may prevent unnecessary use of network bandwidth, computing resources, time, and/or storage space by the computing devices of the provider network and/or the connected devices of client networks.

Figure 1:
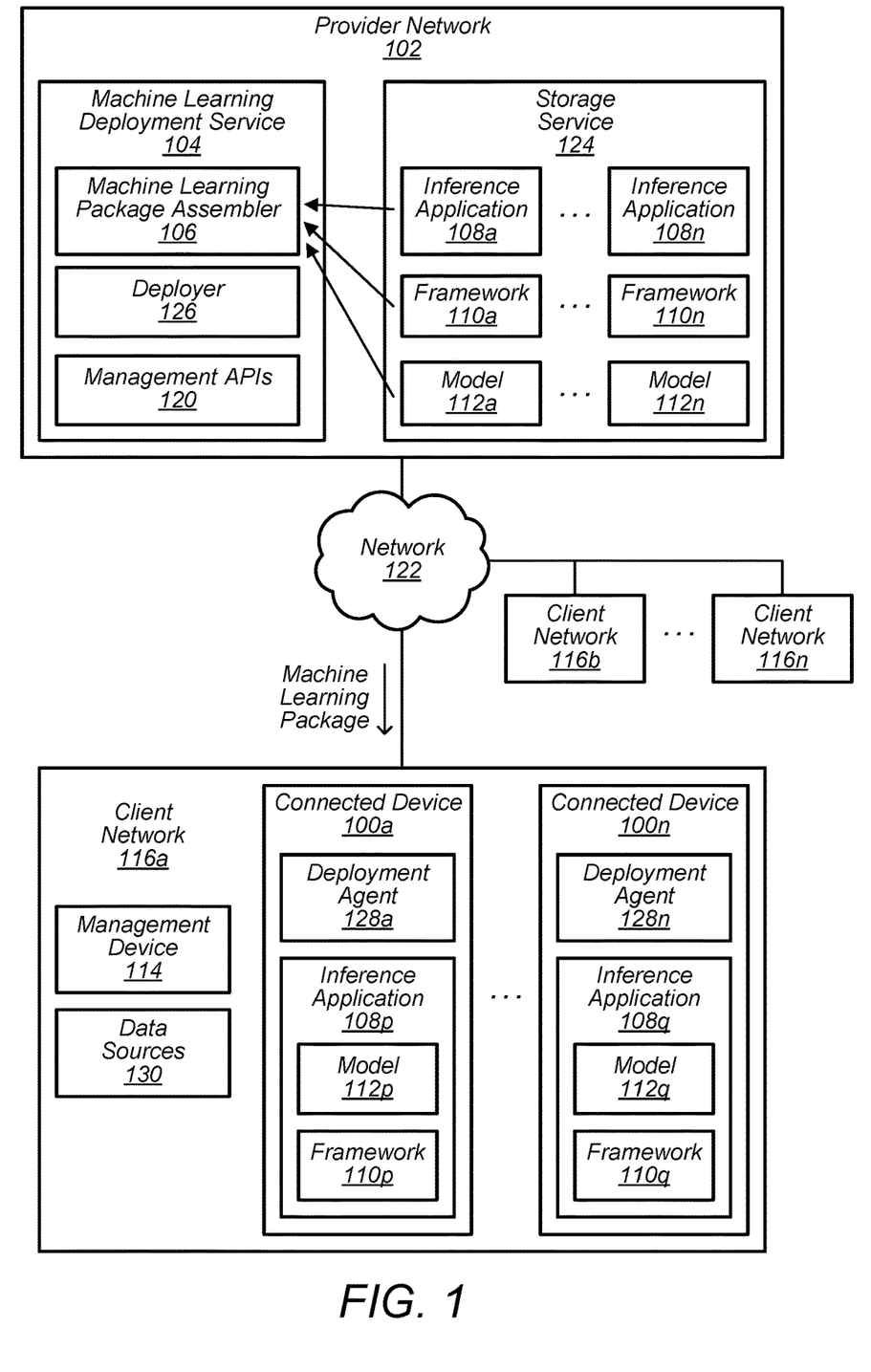
FIG. 1 illustrates a system for generating and deploying packages for machine learning at connected devices, according to some embodiments.

FIG. 1 illustrates a system for generating and deploying packages for machine learning at connected devices, according to some embodiments. The connected devices 100 depicted in FIG. 1 may be the same type of connected device, and include some or all of the same components as other connected devices depicted in FIGS. 1-6, in embodiments. Although certain components of the provider network 102 and/or the machine learning and deployment service 104 are described as performing various actions, any of the actions described as performed by the provider network 102 and/or the machine learning deployment service 104 may be performed by any hardware and/or software component of the provider network 102, the machine learning and deployment service 104, or any other components of the networks in FIGS. 1-6.

In the depicted embodiment, the machine learning deployment service 104 includes a machine learning package generator 106 that may generate a package based at least on an inference application 108, a machine learning framework 110, a machine learning model 112, and/or a hardware platform of the connected device 100. In embodiments, a user may provide an indication (e.g., by selecting or by providing an identifier) to the machine learning deployment service 104 of one of the inference applications 108, one of the machine learning frameworks 110 to be used by the inference application, one of the machine learning models 112 to be used by the inference application, and/or one or more connected devices 100 to run the inference application.

The user may provide the above indication using a management device 114 (e.g., via a graphical user interface and/or command line interface) of the remote client network 116 that communicates with the machine learning deployment service 104 via management application programming interfaces (APIs) 120. For example, the user may provide an indication by selecting a particular inference application, machine learning framework, machine learning model, hardware platform, and/or connected device from a list of one or more available inference applications, machine learning frameworks, machine learning models, hardware platforms, and/or connected devices. In some embodiments, a user may provide an indication by entering into a data field an identifier/name for the inference application, machine learning framework, machine learning model, hardware platform, and/or connected device.

As described in more detail below, for a particular connected device, the machine learning package generator 106 may generate the package based on the indicated inference application 108, machine learning framework 110, machine learning models 112, and/or connected device. In embodiments, the generated package may include multiple portions that are sent to a connected device separately. In such embodiments, the connected device will receive the package in multiple portions and then install the inference application as discussed herein.

In some embodiments, the indication of the connected device provided to the machine learning deployment service 104 includes configuration information that describes the software and/or hardware configuration information of the connected device (e.g., version of installed software and/or installed execution environment, hardware platform, processor architecture, GPU, FPU, etc.). The machine learning deployment service 104 may generate, based on the configuration information, a fingerprint as a unique identifier for the configuration of the connected device. The machine learning deployment service 104 may then store the fingerprint and the configuration information associated with the connected device. As described below for FIG. 5, the machine learning deployment service 104 may use the fingerprint at a later point in time to determine whether the configuration of the connected device has changed.

As shown, any number of client networks 116 may exist, and each of the client networks 116 may include any number of connected devices 100 that may receive packages from the machine learning deployment service 104 in order to install and implement inference applications and associated components as described herein. As shown, the provider network 102 may transmit data to and from devices of any of the client networks 116 via a wide-area network 122 (e.g., the Internet).

In embodiments, the provider network includes a storage service 124 that stores one or more inference applications 108, one or more machine learning frameworks 110, and one or more machine learning models 112 at respective locations of the storage service 124. In some embodiments, one or more of the above components may instead or also be stored by the machine learning deployment service 104 (at least temporarily) or at any other location of the provider network.

As shown, the machine learning deployment service 104 includes a deployer 126. After the machine learning package generator 106 generates the package, the deployer 126 may deploy (e.g., transmit or send) the package to one or more of the connected devices 100 (e.g., connected device 100*a*). In embodiments, the package may be deployed using a series of multiple transmissions. For example, one or more components may be sent, then one or more other components may be sent at one or more later points in time.

In embodiments, the deployment agent may then unpack the components of the package to obtain and/or identify the inference application 108, the machine learning framework 110, the machine learning model 112, and/or one or more other components or data that may be used to configure the connected device 100 to use the inference application 108 and/or the machine learning model 112. In some embodiments, the deployment agent 128 and/or the connected device 100 may then store and/or install the inference application, the machine learning framework, and the machine learning model on the connected device 100.

In embodiments, the connected device 100 may begin execution of the inference application, which in turn executes the machine learning framework. In embodiments, the inference application and/or the machine learning framework may then execute the machine learning model. In some embodiments, the machine learning framework and the machine learning model may be considered as part of the inference application. Therefore, actions described as being performed by the inference application may be performed by the machine learning framework and/or the machine learning model in embodiments.

During execution on the connected device 100, the inference application may collect data from one or more data sources 130 (e.g., image data) and provide the collected data to the machine learning model (e.g., model 112*p*). As described in more detail below, the model 112*p* may be one of the models 112 stored by the provider network 102 or may be a modified version of one of the models 112 stored by the provider network 102. Similarly, the inference application 108*p* and/or the framework 110*p* may be one of the inference applications 108 and/or frameworks 110 stored by the provider network 102 or may be a modified version of one of the inference applications 108 and/or frameworks 110 stored by the provider network 102.

The machine learning model 112*p* may process the collected data to generate inference data (e.g., one or more inferences and/or one or more predictions). In embodiments, the inference application 108*p* may perform one or more actions based on the inference data generated by the machine learning model 112*p* (e.g., activating an alarm based on an inference that image data indicates an intruder).

In embodiments, an execution environment may execute the inference application 108, the framework 110, and/or the model 112 on each respective connected device 100. The execution environment may be a function execution environment and/or any other type of runtime execution environment. Thus, the execution environment may include any number of software and/or hardware components usable to run and/or execute one or more operating systems, processes, functions, and/or applications. In embodiments, an execution environment may be installed on a connected device before or after being shipped to a client. In some embodiments, the execution environment may be downloaded from the provider network 102 to the connected device and installed on the connected device.

Figure 2:
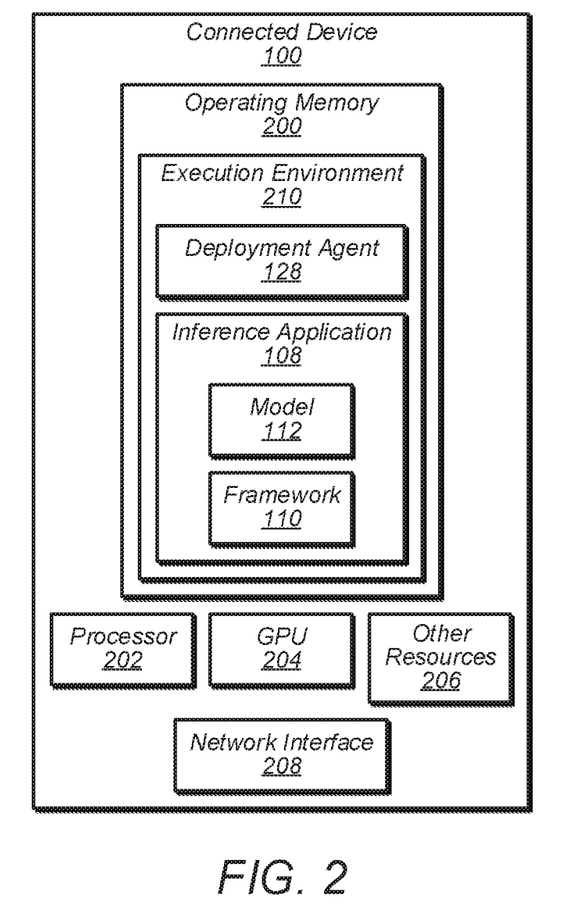
FIG. 2 is a block diagram illustrating example components of a connected device, according to some embodiments.

FIG. 2 is a block diagram illustrating example components of a connected device, according to some embodiments, according to some embodiments. In the depicted embodiment, the connected device 100 includes operating memory 200 (e.g., volatile memory and/or non-volatile memory), a processor 202 (e.g., CPU), a graphics processing unit 204 (GPU), other resources 206, and a network interface 208. In embodiments, the connected device 100 may include one or more additional memories, processors, GPUs, FPUs, or other processors. Different functions that are available for deployment from the machine learning deployment service may require different types of processors, GPUs, FPUs, and/or other hardware components of the connected device 100.

In embodiments, the other resources 206 may include non-volatile memory that stores the inference application, the model, and/or the framework. In some embodiments, the inference application, the model, and/or the framework may be loaded into the operating memory 200 (e.g., after reboot or power failure).

The operating memory includes an execution environment 210 suitable for running a deployment agent 128, inference application(s) 108, machine learning model(s) 112, and machine learning framework(s) 112. In embodiments, the execution environment may provide for event-driven execution of functions, including one or more functions of the inference application 108. For example, one or more of the functions may be invoked in response to the execution environment detecting a triggering event (e.g., receiving and/or detecting data from one or more data sources or receiving a message or command). In embodiments, in response to receiving data from a data source, a function of the inference application 108 may by invoked and execute the model 110 to process the received data to generate inference data. The function (or another function of the inference application) may perform one or more actions based on the inference data (e.g., trigger a security alarm).

In embodiments, one or more event sources may be part of the connected device or part of a separate device (e.g., within the same network or a remote network). For example, a camera may be a type of data source that provides visual data to the connected device, which triggers execution (e.g., launches) a function. In embodiments, the inference application 108, the machine learning model 112, and the machine learning framework 112 are also compatible with an execution environment of the provider network (e.g., executable by an execution environment of the provider network). Therefore, in some embodiments, the inference application, model, and/or framework may also be run at the provider network (e.g., for testing or as a backup for processing data from one or more data sources 130 if the inference application 108 is unable to run (e.g., due to errors or failure) on the connected device 100.

In embodiments, the network interface 208 communicatively couples the connected device 100 to the local network. Thus, the connected device 100 transmits data to and/or receives data from one or more other data source devices, connected devices, the machine learning deployment service 104, or other endpoints of the provider network 102 or client networks 116 via the network interface 208. In embodiments, the network interface 208 may transmit and receive data via a wired or wireless interface.

In various embodiments, the connected device 100 may provide high levels of security (e.g., encrypted messages) to protect data being communicated between connected devices and also between the connected device and the provider network 102. The connected device may provide a simple yet powerful processor and/or operating system to provide platform-agnostic capabilities. In some embodiments, the size of one or more memories and/or one or more processors used by one or more servers of the provider network 102 to implement services (e.g., machine learning deployment service 104 or components of machine learning deployment service) may be at least an order of magnitude larger than the size of the memory and/or the processor used by the connected device 100. However, the connected device 100 may still be powerful enough to run a same or similar function execution environment 210 as one that runs on one or more servers of the provider network 102, in order to invoke and execute the same functions (e.g., event-driven functions).

In embodiments, the execution environment 210 runs the deployment agent 128. The deployment agent 212 may be a program or application that communicates with the deployer 126 and downloads the inference application 108, the machine learning model 112, and the machine learning framework 112 to the connected device.

In some embodiments, the deployment agent 128 may receive from the deployer 126 a notification of a machine learning model, a new version of a machine learning model, or inference application (including the model and framework or including one or more updated functions) that is available for deployment, send a request to the deployer 126 for the model or application, and receive the model or application from the deployer 126. The deployment agent 212 may then install and/or configure the model or application on the connected device. In some embodiments, the deployer 126 instead pushes the model or application to the connected device when it is available, and the deployment agent 212 may then install and/or configure the model or application on the connected device.

Figure 3:
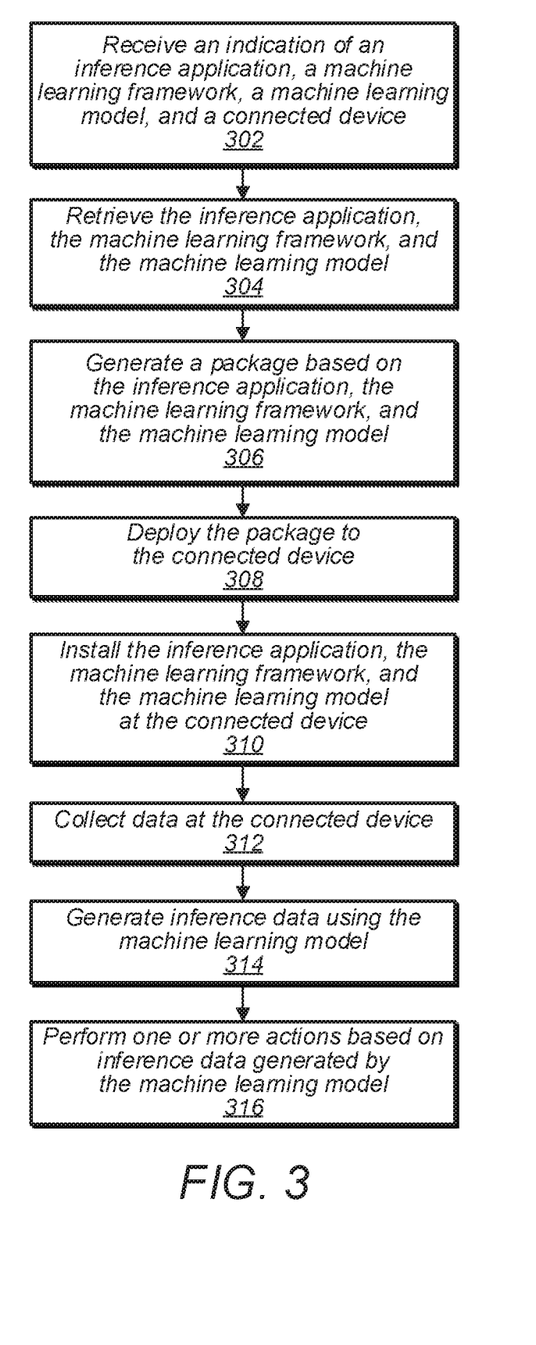
FIG. 3 is a flow diagram illustrating generating and deploying a package for machine learning at a connected device, according to some embodiments.

FIG. 3 is a flow diagram illustrating generating and deploying a package for machine learning at a connected device, according to some embodiments. In various embodiments, one or more portions of the illustrated processes of FIGS. 3, 4, and 6 may be performed via any of one or more components or services of a provider network 102 and/or connected devices 100.

At block 302, the machine learning deployment service receives an indication of an inference application, a machine learning framework to be used by the inference application, a machine learning model to be used by the inference application, and a target connected device 100 to install the inference application onto. At block 304, the machine learning deployment service retrieves the inference application, the machine learning framework, and the machine learning model (e.g., from a storage service).

At block 306, the machine learning deployment service generates a package based on the inference application, the machine learning framework, and the machine learning model. At block 308, the machine learning deployment service deploys the package to the connected device. In some embodiments, the machine learning deployment service may deploy the package to multiple connected devices, where each of the devices installs and runs the inference application as described below.

At block 310, the connected device installs the inference application, the machine learning framework, and the machine learning model on the connected device. At block 312, the inference application collects data from one or more data sources. At block 314, the inference application generates inference data using the machine learning model. At block 316, the inference application performs one or more actions based on the inference data generated by the machine learning model.

Figure 4:
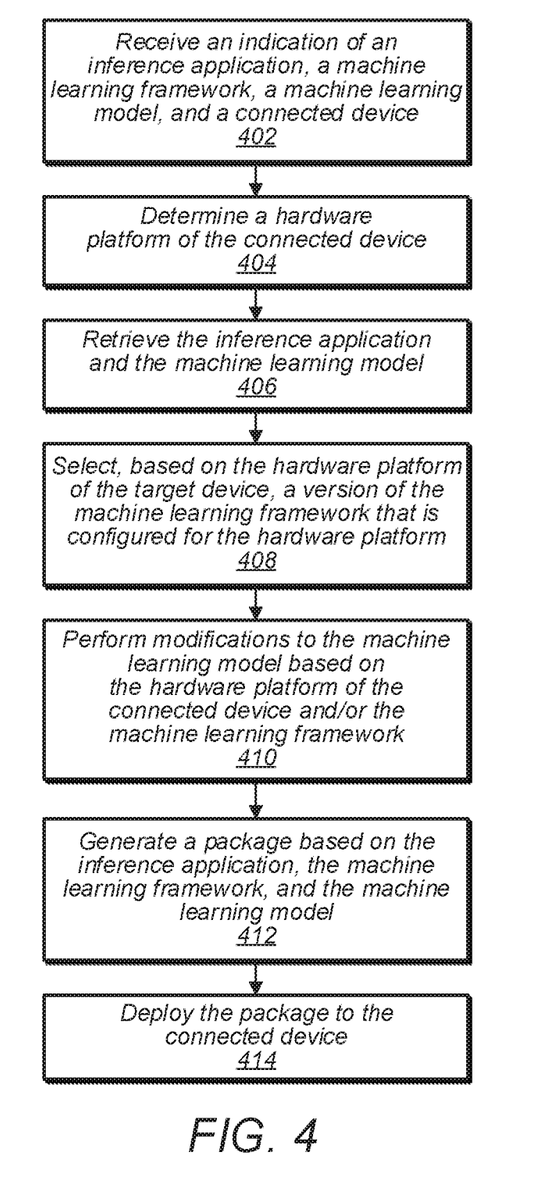
FIG. 4 is a flow diagram illustrating generating a package based on a hardware platform of a connected device and deploying the package for machine learning at the connected device, according to some embodiments.

FIG. 4 is a flow diagram illustrating generating a package based on a hardware platform of a connected device and deploying the package for machine learning at the connected device, according to some embodiments.

At block 402, the machine learning deployment service receives an indication of an inference application, a machine learning framework to be used by the inference application, a machine learning model to be used by the inference application, and a target connected device 100 to install the inference application onto. At block 404, the machine learning deployment service determines a hardware platform of the connected device. In embodiments, to do so, the service may determine one or more hardware components or a hardware architecture of the connected device. In embodiments, the service may determine a vendor of the connected device and/or a particular version of the device. In some embodiments, some or all of the information describing the hardware platform may be provided to the service (e.g., by a user via a management device).

In some embodiments, a particular inference application is selected from among a group of different inference applications that are stored by the provider network (e.g., at a storage service). In embodiments, the different inference applications are configured to process data generated by different machine learning models.

In embodiments, each of the different inference application may serve as a blueprint, which may or may not be modified by the client (e.g., by modifying code). For example, a particular inference application may be for use by a self-driving car. Therefore, the application may be written to be used with a machine learning model that generates inference data based on sensor data from a camera mounted on the car.

At block 406, the machine learning deployment service retrieves the inference application and the machine learning model (e.g., from a storage service). In some embodiments, multiple different versions of the inference application (e.g., blueprints) and/or the machine learning model may be stored by the provider network, where each version is configured to be run on a different hardware platform (e.g., different type of connected device). Therefore, in some embodiments, a particular version of the inference application and/or the machine learning model configured for the hardware platform of the connected device is selected and/or retrieved from among multiple versions.

In some embodiments, the machine learning deployment service receives an identifier from a user (e.g., a network address or model name) that indicates a storage location of the desired machine learning model on the provider network. The machine learning deployment service may then retrieving the machine learning model from the storage location.

In embodiments, the retrieved machine learning model may have been trained by a model training service of the provider network. In some embodiments, the retrieved machine learning model may have been trained by a model training service of another remote network and subsequently transmitted to the provider network for storage.

At block 408, the machine learning deployment service selects and/or retrieves (e.g., from a storage service), based on the hardware platform of the connected device, a version of the machine learning framework that is configured for the hardware platform of the connected device. In embodiments, multiple different versions of the machine learning framework may be stored by the provider network, where each version is configured (e.g., "pre-configured") to be run on a different hardware platform based on optimizations specific to the hardware platform or optimizations that are different than those made for other hardware platforms (e.g., based on different types of connected device from different vendors). Therefore, in some embodiments, a particular version of the machine learning framework is selected and/or retrieved from among multiple versions.

In some embodiments, a model may be trained based using a particular framework and/or platform (e.g., vendor-specific), but the model will be run on the connected device using a different framework and/or platform (e.g., a different vendor). Thus, the machine learning deployment service will select the different framework. In such cases, the machine learning deployment service may also modify the model based on optimizations specific to the different framework.

At block 410, the machine learning deployment service performs modifications to the machine learning model based on the hardware platform of the connected device and/or the machine learning framework. In embodiments, the modifications may optimize the model for running on the particular hardware platform. Thus, in embodiments, the machine learning deployment service performs different modifications for the same model to optimize the model for different hardware platforms. In some embodiments, a trained model may not be optimized for any particular hardware platform or framework (e.g., a "generic" or non-optimized model). Thus, the machine learning deployment service may modify the model to optimize the model to be run by a hardware platform of the connected device and/or to be run by the selected framework.

In embodiments, the modifications may reduce the size of the machine learning model. Therefore, the model will consume a smaller amount of hardware resources (e.g., memory and processor resources) due to its smaller footprint.

In some embodiments, the modifications may configure the model to generate inference data at a faster rate than the unmodified model. In embodiments, the faster rate may be achieved by configuring at least some of the model to be executed by hardware that is unique to the particular hardware platform of the connected device with respect to other hardware platforms. In embodiments, the hardware may be available on some hardware platforms (including that of the connected device), but not on other hardware platforms (e.g., platforms of other types and/or other vendors).

In some embodiments, the machine learning deployment service receives an indication (e.g., via a user selection through the management device using a graphical user interface or command line interface) of one or more hardware resources of the at least one connected device to be accessible by the inference application. For example, one or more hardware resources may be selected from multiple different available resources. In some embodiments, the user may enter a name/identifier of one or more of the resources for selection. The machine learning deployment service may configure the inference application to use the one or more hardware resources.

The hardware resources may include any local hardware resource of the connected device that may be used by the inference application, machine learning framework, and/or machine learning model. For example, the hardware resources may include a processor configured to accelerate generation of inference data by the machine learning model (e.g., GPU), memory, a camera, sensor, or any other devices that my provide a source of data for the machine learning model to process.

At block 412, the machine learning deployment service generates a package based on the inference application, the machine learning framework, and the machine learning model. At block 414, the machine learning deployment service deploys the package to the connected device. In some embodiments, the machine learning deployment service may deploy the package to multiple connected devices, where each of the devices installs and runs the inference application.

Figure 5:
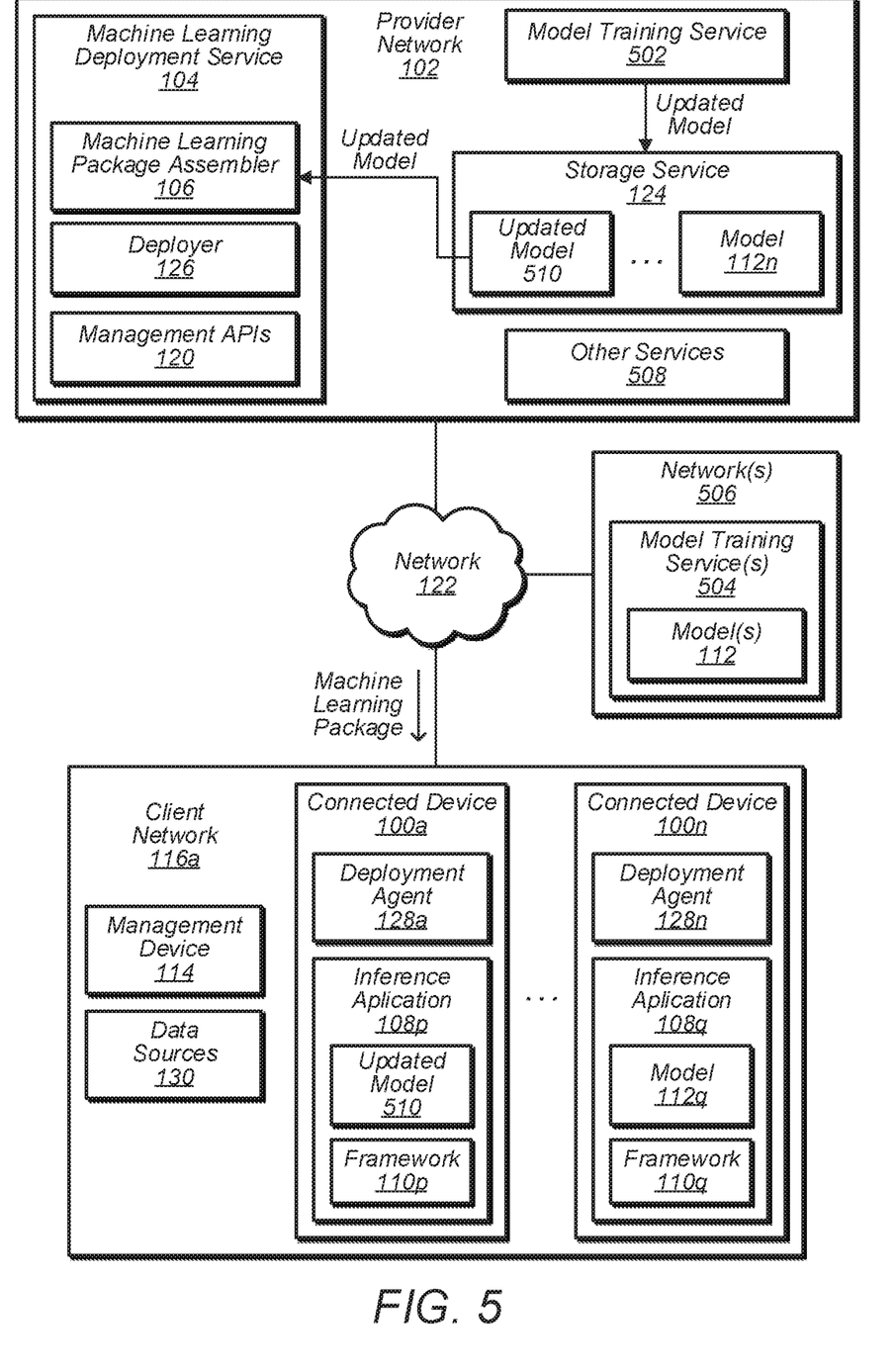
FIG. 5 illustrates a system for generating and deploying packages with updated models for machine learning at connected devices, according to some embodiments.

FIG. 5 illustrates a system for generating and deploying packages with updated models for machine learning at connected devices, according to some embodiments. In the depicted embodiment, the provider network 102 also includes a model training service 502 that trains one or more of the machine learning models 112 before they are made available for deployment (e.g., stored by the storage service 124 as models available for retrieval by the machine learning deployment service).

In some embodiments, one or more of the models 112 may be trained by one or more other model training services 504 of other remote networks 506 and then sent to the provider network via the network 122. In embodiments, the provider network may use one or more other services 508 to train or generate the models 112. For example, the model training service 502 may use one or more compute instances of a compute service to process large quantities of training data to generate a model 112.

In the depicted embodiment, the model training service 502 generates an updated version of a machine learning model and stores the updated model 510 to the storage service 124. As mentioned above, in some embodiments, the machine learning deployment service 104 itself may store the updated model.

In embodiments, the model training service 502 may generate the updated model 510 in response to receiving additional training data from a client and/or from one or more other sources of training data (e.g., data collected from one or more other remote networks). In some embodiments, the model training service 502 may implement a new training algorithm to generate the updated model 510 that is different than a previous algorithm used to generate the previous version of the model.

The machine learning deployment service 104 may retrieve the updated model 510 (and in some cases the inference application and/or framework), generate a package based at least on the updated model 510 (and in some cases the inference application and/or framework), and deploy the package to one or more connected devices that have a previous version of the model 510 based on a previous deployment. As described below, in some embodiments, the machine learning deployment service 104 may provide a notification that the updated model 510 is available instead of automatically pushing it to the connected device.

In some embodiments, in response to receiving a notification from the machine learning deployment service 104 that the updated model 510 is available for deployment, a connected device may send a fingerprint to the machine learning deployment service 104, where the fingerprint is based on the current software and/or hardware configuration of the connected device. In embodiments, the fingerprint may have been previously generated or may be generated in response to receiving the notification from the machine learning deployment service 104. In embodiments, the same algorithm may be used to generate the fingerprint as that used by the machine learning deployment service 104. Therefore, for the same configuration information, the same fingerprint may be generated by the connected device and by the machine learning deployment service 104.

In embodiments, in response to receiving the fingerprint from the connected device, the machine learning deployment service 104 may determine whether the received fingerprint matches the stored fingerprint. If so, then the machine learning deployment service 104 may determine that the software and/or hardware configuration of the connected device has not changed. Thus, the machine learning deployment service 104 determine that the stored configuration information associated with the stored fingerprint. The machine learning deployment service 104 may then generate a package based on the updated model, the stored configuration information, and/or the hardware platform of the connected device.

However, if the received fingerprint does not match the stored fingerprint, then the machine learning deployment service 104 may determine that the software and/or hardware configuration of the connected device has changed. The machine learning deployment service 104 may then send a request to the connected device to provide configuration information that describes the new software and/or hardware configuration information of the connected device. The machine learning deployment service 104 may then generate a package based on the updated model, the new configuration information, and/or the hardware platform of the connected device and deploy the package to the connected device. The machine learning deployment service 104 may also generate a new fingerprint and store the new fingerprint and the configuration information associated with the connected device.

In some embodiments, the connected device may perform the fingerprint comparisons and associated determinations instead of the machine learning deployment service 104. For example, in response to receiving the notification of the updated model, the connected device may generate a new fingerprint based on the current configuration of the connected device and compare it to a previously generated fingerprint (either stored at the connected device or received from the machine learning deployment service 104 along with the notification).

If the fingerprints match, the connected device may send an indication to the machine learning deployment service 104 that he configuration has not changed. If the fingerprints do not match, then the machine learning deployment service 104 may send to the machine learning deployment service 104 the new configuration information for the connected device and/or the newly generated fingerprint. The machine learning deployment service 104 may then generate a package based on the updated model, the new configuration information, and/or the hardware platform of the connected device and deploy the package to the connected device. In some embodiments, both the connected device and the machine learning deployment service 104 may perform some or all of the above actions (e.g., various comparisons, determinations, and sending of information).

As described for figures above, generating the package may include modifying the updated model 510. For example, the updated model may be modified based on the hardware platform of the connected device and/or the machine learning framework. In some embodiments, multiple packages may be generated based on different connected devices that the updated model 510 will be deployed to. For example, one package may include an updated model with certain modifications based on a particular hardware platform and/or framework while another package may include the updated model with different modifications based on a different hardware platform and/or framework. The one or more packages may then be deployed to one or more respective connected devices (e.g., connected device 510).

Figure 6:
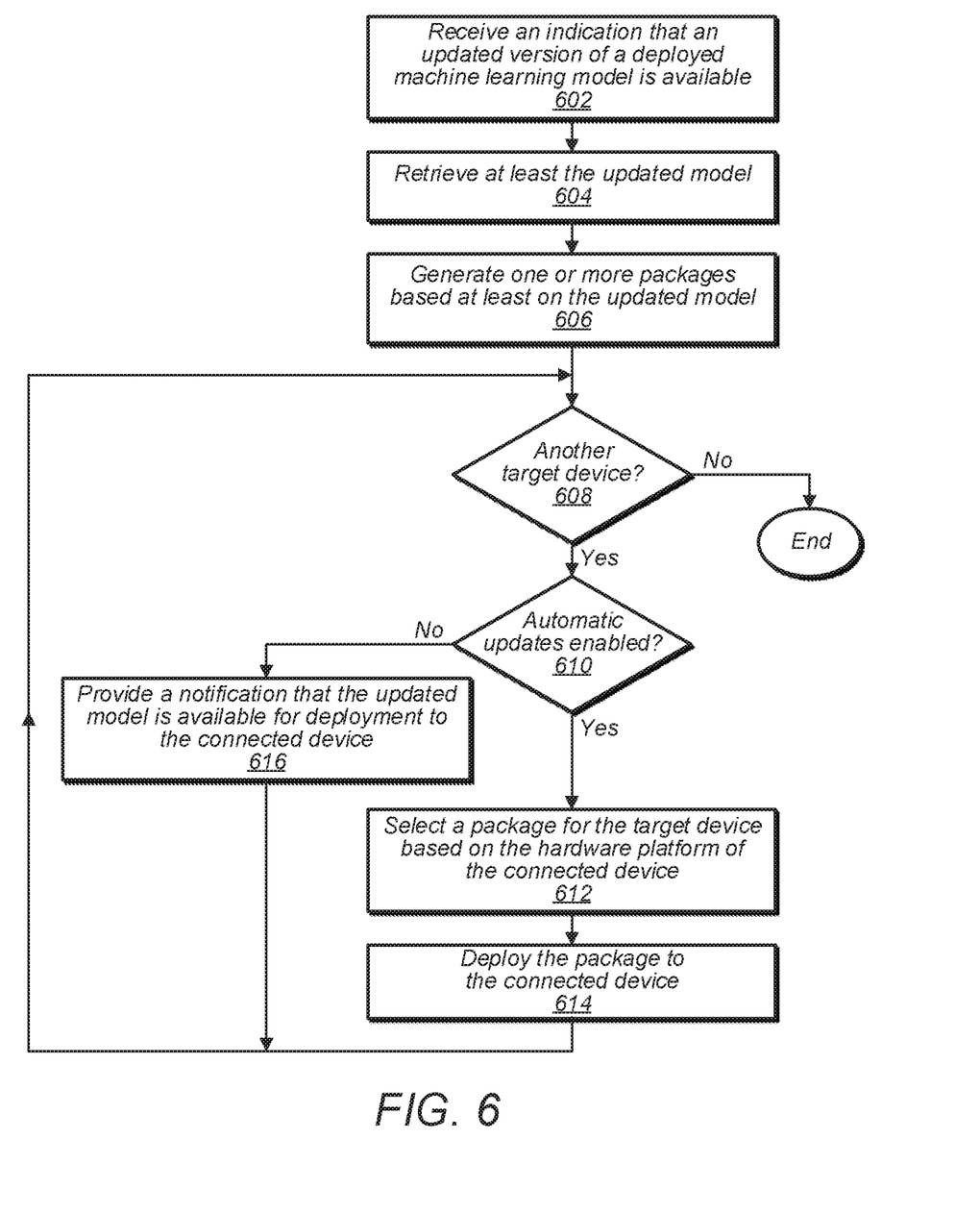
FIG. 6 is a flow diagram illustrating generating and deploying packages with updated models for machine learning at connected devices, according to some embodiments.

FIG. 6 is a flow diagram illustrating generating and deploying packages with updated models for machine learning at connected devices, according to some embodiments.

At block 602, the machine learning deployment service receives an indication that an updated version of a deployed model is available for deployment.

At block 604, the machine learning deployment service retrieves at least the updated model. In embodiments, the machine learning deployment service also retrieves the inference application and/or the machine learning framework. As described above, the machine learning deployment service may select the inference application and/or the machine learning framework from among a plurality of version based on one or more criteria.

At block 606, the machine learning deployment service generates one or more packages based at least on the updated model. As described above, in some embodiments, multiple packages may be generated based on different types of connected devices that the updated model will be deployed to. In embodiments, the machine learning deployment service may modify the machine learning model as described in FIGS. 3 and 4 based on any of the described factors.

At block 608, the machine learning deployment service determines whether there is another connected device to deploy the updated model to. If so, then at block 610, the machine learning deployment service determines whether automatic updates are enabled for the connected device. If so, then at block 612, the machine learning deployment service selects a package for the connected device from among the one or more packages generated at block 606, based on the hardware platform of the connected device. At block 614, the machine learning deployment service deploys the package to the connected device. The process then returns to block 608.

At block 610, if the machine learning deployment service determines that automatic updates are not enabled for the connected device, then at block 616, the machine learning deployment service provides a notification that the updated model is available for deployment to the target device. For example, the machine learning deployment service may send a notification to the connected device, the management device, and/or one or more other computing devices to indicate to the client that the updated model is available. As described above for FIG. 5, in some embodiments, the machine learning deployment service may receive a fingerprint from the connected device and if necessary, generate a package based on the updated model, the new configuration information, and/or the hardware platform of the connected device and deploy the package to the connected device. The process then returns to block 608. At block 608, if the machine learning deployment service determines that there are no more connected devices that are using a previous version of the updated model, then the process ends.

Figure 7:
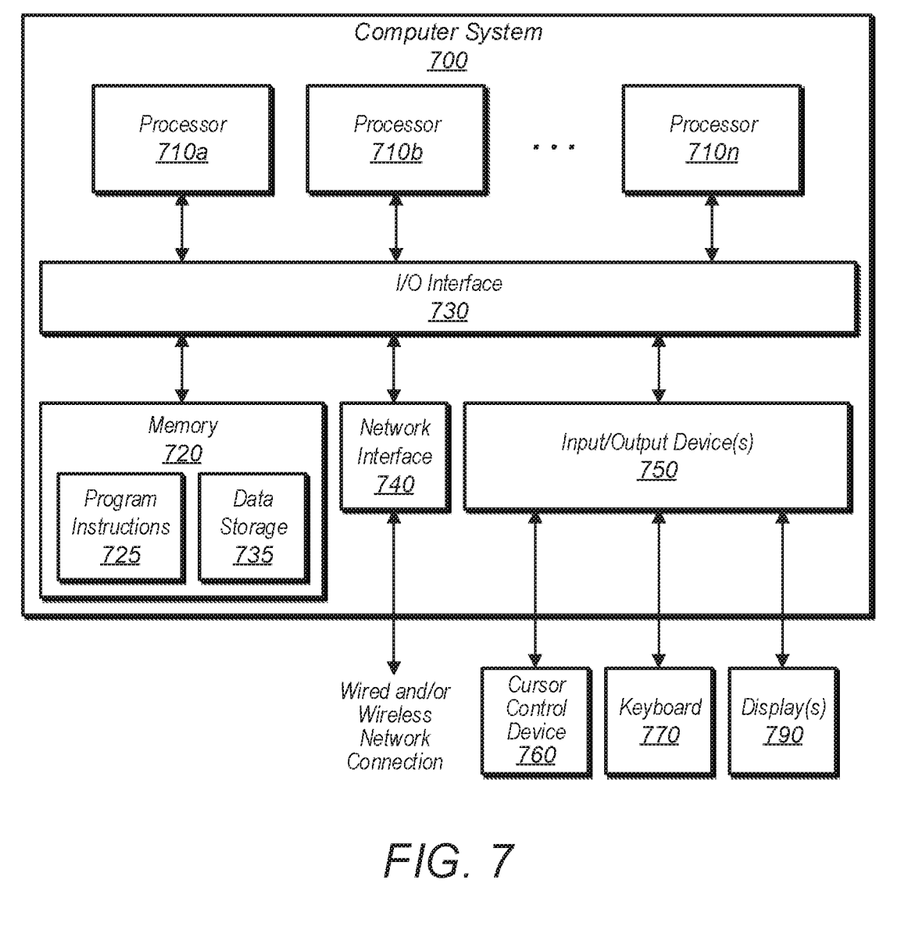
FIG. 7 is a block diagram illustrating an example computer system that implements some or all of the techniques described herein, according to some embodiments.

Any of various computer systems may be configured to implement processes associated with determining function compatibility with IoT devices and deploying functions to IoT devices. For example, FIG. 7 is a block diagram illustrating one embodiment of a computer system suitable for implementing at least some of the systems and methods described herein. In various embodiments, the connected devices 100, computing devices that implement services of the provider network 102, and/or any other described components may each include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between the connected device 100 and other computer systems, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.7, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the connected devices, various services or components of the provider network, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network comprising respective processors and memory to implement a machine learning deployment service to:
receive, from a user of a client of the machine learning deployment service via a management interface of the machine learning deployment service a set of indications including:
a first indication, from the user, of an inference application, wherein the inference application comprises one or more functions configured to perform one or more actions based on inference data generated by a machine learning model;
a second indication, from the user, of a machine learning framework to be used by the inference application, wherein the second indication of the machine learning framework is based on a selection by the user of the machine learning framework from among a plurality of machine learning frameworks stored at the provider network that are available for selection, based on user input via the management interface at the provider network, to be used by the inference application when the inference application is executed on at least one connected device of a remote network of the client, wherein the machine learning framework is configured to run at least a portion of a machine learning model;
a third indication, from the user, of the machine learning model to be used by the inference application, wherein the third indication of the machine learning model is based on a selection by the user of the machine learning model from among a plurality of machine learning models stored at the provider network that are available for selection, based on the user input via the management interface at the provider network, to be used by the inference application when the inference application is executed on the at least one connected device of the remote network of the client, wherein the machine learning model is configured to generate the inference data based on collected data; and
a fourth indication, from the user, of at least one connected device of a remote network of the client to run the inference application, wherein the first indication, the second indication, the third indication, and the fourth indication are different indications received from the same user via the management interface;
responsive to receipt, from the user via the management interface of the machine learning deployment service, of the set of indications:
generate a package based at least on the inference application, the machine learning framework, and the machine learning model; and
deploy the package from the provider network to the at least one connected device of the remote network of the client based on the fourth indication, from the user, of the at least one connected device of the remote network of the client to run the inference application,
wherein another package is deployed from the provider network to another connected device to run the inference application using a different machine learning model based at least on an indication of the other connected device and a selection of the different machine learning model from among the plurality of machine learning models.

2. The system as recited in claim 1, wherein to generate the package, the one or more computing devices are configured to implement the machine learning deployment service to:
determine a hardware platform of the at least one connected device; and
perform modifications to the machine learning model based on the hardware platform of the at least one connected device, wherein the modified machine learning model is optimized for running on the hardware platform.

3. The system as recited in claim 2, wherein to perform modifications to the machine learning model, the one or more computing devices are further configured to implement the machine learning deployment service to:
perform additional modifications to the machine learning model based on the machine learning framework, wherein the modified machine learning model is optimized for the hardware platform and the machine learning framework.

4. The system as recited in claim 1, wherein the one or more computing devices are configured to implement the machine learning deployment service to:
receive an indication that an updated version of the machine learning model is available;
retrieve at least the updated machine learning model;
generate another package based at least on the updated machine learning model; and
deploy the other package to the at least one connected device.

5. The system as recited in claim 1, wherein to generate the package, the one or more computing devices are configured to implement the machine learning deployment service to:
determine a hardware platform of the at least one connected device; and
select, based on the hardware platform of the at least one connected device, a version from among a plurality of versions of the machine learning framework that are pre-configured for different respective hardware platforms, wherein the selected version of the machine learning framework is pre-configured for the hardware platform of the at least one connected device.

6. A method, comprising:
performing, by one or more computing devices of a provider network that implement a machine learning deployment service:
receiving, from a user of a client of the machine learning deployment service, via a management interface of the machine learning deployment service a set of indications including:
a first indication, from the user, of an inference application, wherein the inference application comprises one or more functions configured to perform one or more actions based on inference data generated by a machine learning model;
a second indication, from the user, of a machine learning framework configured to run at least a portion of a machine learning model, wherein the second indication of the machine learning framework is based on a selection by the user of the machine learning framework from among a plurality of machine learning frameworks stored at the provider network that are available for selection, based on user input via the management interface at the provider network, to be used by the inference application when the inference application is executed on at least one connected device of a remote network of the client;
a third indication, from the user, of the machine learning model to be used by the inference application, wherein the third indication of the machine learning model is based on a selection by the user of the machine learning model from among a plurality of machine learning models stored at the provider network that are available for selection, based on the user input via the management interface at the provider network, to be used by the inference application when the inference application is executed on the at least one connected device of the remote network of the client, wherein the machine learning model is configured to generate the inference data; and
a fourth indication, from the user, of at least one connected device of a remote network of the client to run the inference application, wherein the first indication, the second indication, the third indication, and the fourth indication are different indications received from the same user via the management interface; and
responsive to receipt, from the user via the management interface of the machine learning deployment service, of the set of indications:
generating a package based at least on the inference application, the machine learning model, and the machine learning framework; and
deploying the package from the provider network to the at least one connected device of the remote network of the client based on the fourth indication, from the user, of the at least one connected device of the remote network of the client to run the inference application,
wherein another package is deployed from the provider network to another connected device to run the inference application using a different machine learning model based at least on an indication of the other connected device and a selection of the different machine learning model from among the plurality of machine learning models.

7. The method as recited in claim 6, wherein generating the package comprises:
determining a hardware platform of the at least one connected device; and
performing modifications to the machine learning model based on the hardware platform of the at least one connected device, wherein the modified machine learning model is optimized for running on the hardware platform.

8. The method as recited in claim 7, wherein performing modifications to the machine learning model comprises reducing a size of the machine learning model.

9. The method as recited in claim 6, further comprising:
generating another package based at least on an updated version of the machine learning model; and
deploying the other package to the at least one connected device.

10. The method as recited in claim 9, wherein generating the other package further comprises:
performing modifications to the updated machine learning model based on the hardware platform of the at least one connected device, wherein modifications reduce a size of the updated machine learning model.

11. The method as recited in claim 6, further comprising:
receiving an indication of one or more hardware resources of the at least one connected device to be accessible by the inference application; and
configuring the inference application to use the one or more hardware resources.

12. The method as recited in claim 11, wherein the one or more hardware resources comprises a processor configured to accelerate generation of the inference data by the machine learning model.

13. The method as recited in claim 6, further comprising:
retrieving one or more of the inference application, the machine learning model, or the machine learning framework from a storage location of the provider network.

14. The method as recited in claim 6, wherein the receiving the indication of the inference application comprises:
receiving a selection of the inference application from among a plurality of inference applications stored by the provider network, wherein different ones of the inference applications are configured to process data generated by different machine learning models.

15. A non-transitory computer-readable storage medium storing program instructions that, when executed by one or more computing devices for a machine learning deployment service of a provider network, cause the one or more computing devices to implement:
receiving, from a user of a client of the machine learning deployment service, via a management interface of the machine learning deployment service a set of indications including:
a first indication from the user of an inference application, wherein the inference application comprises one or more functions configured to perform one or more actions based on inference data generated by a machine learning model;
a second indication, from the user, of a machine learning framework configured to run at least a portion of a machine learning model, wherein the second indication of the machine learning framework is based on a selection by the user of the machine learning framework from among a plurality of machine learning frameworks stored at the provider network that are available for selection, based on user input via the management interface at the provider network, to be used by the inference application when the inference application is executed on at least one connected device of a remote network of the client;

a third indication, from the user, of the machine learning model to be used by the inference application, wherein the third indication of the machine learning model is based on a selection by the user of the machine learning model from among a plurality of machine learning models stored at the provider network that are available for selection, based on the user input via the management interface at the provider network, to be used by the inference application when the inference application is executed on the at least one connected device of the remote network of the client, wherein the machine learning model is configured to generate the inference data; and a fourth indication, from the user, of at least one connected device of a remote network of the client to run the inference application, wherein the first indication, the second indication, the third indication, and the fourth indication are different indications received from the same user via the management interface; and responsive to receipt, from the user via the management interface of the machine learning deployment service, of the set of indications:

generating a package based at least on the inference application, the machine learning framework, and the machine learning model; and deploying the package from the provider network to the at least one connected device of the remote network of the client based on the fourth indication, from the user, of the at least one connected device of the remote network of the client to run the inference application, wherein another package is deployed from the provider network to another connected device to run the inference application using a different machine learning model based at least on an indication of the other connected device and a selection of the different machine learning model from among the plurality of machine learning models.

16. The computer-readable storage medium as recited in claim 15, wherein program instructions cause the one or more computing devices to implement:

determining a hardware platform of the at least one connected device; and performing modifications to the machine learning model based on the hardware platform of the at least one connected device, wherein the modified machine learning model is optimized for running on the hardware platform.

17. The computer-readable storage medium as recited in claim 15, wherein program instructions cause the one or more computing devices to implement:

generating another package based at least on an updated version of the machine learning model;

performing modifications to the updated machine learning model based on a hardware platform of the at least one connected device; and deploying the other package to the at least one connected device.

18. The computer-readable storage medium as recited in claim 15, wherein program instructions cause the one or more computing devices to implement:

receiving an indication of one or more hardware resources of the at least one connected device to be accessible by the inference application; and configuring the inference application to use the one or more hardware resources.

19. The computer-readable storage medium as recited in claim 15, wherein to generate the package, the program instructions cause the one or more computing devices to implement:

selecting, based on the hardware platform of the at least one connected device, a version from among a plurality of versions of the machine learning framework that are pre-configured for different respective hardware platforms, wherein the selected version of the machine learning framework is pre-configured for the hardware platform of the at least one connected device.

20. The computer-readable storage medium as recited in claim 15, wherein the program instructions cause the one or more computing devices to implement:

send a notification to the at least one connected device that an updated version of the machine learning model is available;

receive a fingerprint from the connected device;

determine whether the received fingerprint matches a fingerprint stored at the provider network, wherein the stored fingerprint is associated with stored configuration information describing a previous configuration of the connected device; and in response to determining that the received fingerprint does not match the stored fingerprint, sending a request to the connected device to provide configuration information that describes a current software and/or hardware configuration information of the connected device.

* * * * *